United States Patent [19]

Dang

[11] Patent Number: 5,642,339
[45] Date of Patent: Jun. 24, 1997

[54] SUB-CAROUSEL DATA STORAGE LIBRARY

[75] Inventor: Chi Hung Dang, Tucson, Ariz.

[73] Assignee: International Business Machines Corporation, Armonk, N.Y.

[21] Appl. No.: 406,274

[22] Filed: Mar. 16, 1995

Related U.S. Application Data

[63] Continuation of Ser. No. 484,637, Apr. 16, 1993, abandoned.

[51] Int. Cl.⁶ .................................................. G11B 17/22
[52] U.S. Cl. .................................... 369/36; 369/37
[58] Field of Search .......................... 369/36, 37; 360/92

[56] References Cited

U.S. PATENT DOCUMENTS

| | | | |
|---|---|---|---|
| 3,525,086 | 8/1970 | Lichowsky | 340/174.1 |
| 3,809,263 | 5/1974 | Dodd et al. | 214/16.4 R |
| 4,232,988 | 11/1980 | Kochanneck | 414/331 |
| 4,252,488 | 2/1981 | Kochanneck | 414/331 |
| 4,314,293 | 2/1982 | Paulson | 360/92 |
| 4,609,232 | 9/1986 | Florence | 312/16 |
| 4,670,866 | 6/1987 | Hasegawa et al. | 369/37 |
| 4,742,405 | 5/1988 | Teranishi | 360/92 |
| 5,020,043 | 5/1991 | Kohler | 369/36 |
| 5,062,763 | 11/1991 | Maier | 414/787 |
| 5,065,265 | 11/1991 | Pierrat | 360/92 |
| 5,108,246 | 4/1992 | Baur | 414/223 |
| 5,285,333 | 2/1994 | Barr et al. | 360/92 |

FOREIGN PATENT DOCUMENTS

| | | | |
|---|---|---|---|
| 0293494 | 12/1986 | European Pat. Off. | G11C 11/42 |
| 39 06 017 | 2/1989 | European Pat. Off. | |
| 0 376 035 A2 | 12/1989 | European Pat. Off. | |
| 0417886 | 6/1990 | European Pat. Off. | G11B 22/00 |
| 1084953 | 11/1958 | Germany | G11B 12/26 |
| 2319178 | 6/1975 | Germany | |
| 3621790 | 1/1988 | Germany | G11B 15/68 |
| 61-158063 | 7/1986 | Japan | 360/92 |
| 61-170953 | 8/1986 | Japan | 360/92 |
| 1179266 | 7/1989 | Japan | 360/92 |

OTHER PUBLICATIONS

Callender, "Tape Cartridge Library System," IBM Technical Disclosure Bulletin, vol. 25, No. 10, Mar. 1983, pp. 5006–5007.

Bjorklund, Koestner, Levine and Swenson, "Carrousel Random-Access Device," IBM Technical Disclosure Bulletin, vol. 15, No. 4, Sep. 1972, pp. 1196–1197.

IBM Technical Disclosure Bulletin, vol. 15, No. 6, Nov., 1972, "Disk File", p. 1910.

*Primary Examiner*—A. J. Heinz
*Assistant Examiner*—David D. Davis
*Attorney, Agent, or Firm*—Baker, Maxham, Jester & Meador

[57] ABSTRACT

A recordable media library is provided wherein the library includes a plurality of carousels, one of the carousels being a primary carousel and the other carousels being sub-carousels. The sub-carousels have recordable media receptacles, such as that used for cartridges of optical or magnetic data. A support such as a framework, is provided. The primary carousel is mounted on the support for rotation about a central axis. The sub-carousels are rotatably mounted on the primary carousel, each sub-carousel having an axis of rotation which is coextensive with the central axis of the primary carousel. With this arrangement any one or a combination of the sub-carousels can be rotated with respect to the primary carousel into a location where a recordable media receptacle can be accessed by one or more cartridge pickers. The cartridge pickers may be mounted on the support for movement along respective axes which are parallel to the central axis of the carousels. With this arrangement the cartridge pickers can reach any cartridge receptacle within the respective sub-carousels. Independent operation of the sub-carousels minimizes the amount of mass to be moved. However, if a sub-carousel should fail, the primary carousel can be rotated, as a back-up, to provide access to any one of the sub-carousels mounted thereon.

44 Claims, 5 Drawing Sheets

$C_i$ = CAROUSEL i
$C_n$ = ALL CAROUSELS OTHER THAN $C_i$
$C_b$ = PRIMARY CAROUSEL (28)
$\theta_i$ = PRESENT LOCATION OF $C_i$
$\theta_n$ = PRESENT LOCATION OF $C_n$
$\sigma_i$ = SPEED OF $C_i$
$T_i$ = TORQUE TO TURN $C_i$
$\alpha_i$ = DESIGNATED LOCATION OF $C_i$
$T_m$ = MAXIMUM ALLOWABLE TORQUE TO TURN $C_i$

SUB-CAROUSEL DATA STORAGE LIBRARY

This application is a continuation of application Ser. No. 08/048,437, filed Apr. 16, 1993, now abandoned.

BACKGROUND OF THE INVENTION

1. Field of the Invention

The present invention relates to a data storage library of the type which has a plurality of independently rotatable data carrying sub-carousels which can be accessed by a linearly operated retrieval device.

2. Discussion of the Related Art

The carousel type of data storage library has become very popular because it is compact. Further, its data retrieval device, such as a cartridge picker, need only operate along one axis instead of two axes. The carousel library is especially useful for recordable media cartridges, such as cartridges for optical disks or cartridges for magnetic tapes or disks. The typical carousel rotates about a central vertical axis and has a plurality of cartridge receptacles which are arranged in vertical columns. The most compact carousel employs four columns arranged 90° from one another about a common axis. This type of carousel takes up a minimum amount of floor space.

If a large library is needed in a small space, the four column carousel can be used by increasing its height. However, when the height is increased, the carousel becomes less efficient because of its increased weight. The designer attempts to keep the carousel as light as possible. However, when the carousel is filled with recordable media cartridges the total mass becomes substantial. This total mass is moved every time a new location is accessed by a cartridge picker. The results are slower access time and wear and tear on the motor and drive train.

An even greater problem of prior art carousel type data storage libraries is that when the motor and/or drive train fails the entire library is shut down. In the past there has been no provision for any backup operation of the library. A library could be shut down for literally days while waiting for proper servicing. This would be unacceptable to a user who relies upon the data in his library for the operation of his business.

SUMMARY OF THE INVENTION

The present invention overcomes the problems associated with the prior art carousel type of data storage libraries by providing a unique arrangement of multi-carousels. One of the carousels is a primary carousel and the other carousels are sub-carousels. Each sub-carousel may be provided with a plurality of recordable media cartridge receptacles. A support device, such as a framework, is provided for mounting the carousels. The primary carousel is mounted on the support device for rotation about a central axis. The sub-carousels are rotatably mounted on the primary carousel, each sub-carousel having an axis of rotation which is co-extensive with the central axis of the primary carousel. With this arrangement the rotation of the primary carousel will cause all of the sub-carousels to rotate therewith or any single or combination of sub-carousels can be rotated while the primary carousel is kept stationary. Two very important features of the invention occur with this operation, namely: (1) a single sub-carousel can be rotated while all of the other carousels are kept stationary, thus realizing quicker access time and less wear and tear on the power train; and (2) should any sub-carousel fail, the primary carousel can be rotated by its power device to maintain operability of the library.

In the preferred embodiment, a motor is provided for each sub-carousel and each of these motors is mounted to the primary carousel. Each of the sub-carousel motors has a drive train which extends from the primary carousel to the respective sub-carousel. The primary carousel is also provided with a motor and corresponding drive train which is bigger than required for any individual sub-carousel. The primary carousel motor is mounted on the support device and a drive train extends between that motor and the primary carousel. In the preferred embodiment the open ends of the cartridge receptacles are alignable for access in a plurality of planes which are parallel to the central axis of rotation of the carousels. With this arrangement any sub-carousel cartridge receptacle can be accessed by one or more cartridge pickers which operate within the planes.

An object of the present invention is to overcome the aforementioned problems associated with prior art carousel type of data storage libraries.

Another object is to provide a carousel type data storage library wherein power requirements can be kept to a minimum.

A further object is to provide a carousel type data storage library which has multi-independently powered carousels which are arranged in such a manner that complete operation of a library is preserved even though one of the carousels becomes inoperative.

Yet another object is to accomplish the aforementioned object with minimal power prior to the occurrence of one of the carousels becoming inoperative.

Still another object is to provide a carousel type of data storage library which is compact, efficient and which has its own backup capability in case of a power failure.

Still a further object is to provide a method of operating a multi-carousel type of data storage library with minimum power, backup capability in case of a power failure, and accessibility along a plane of operation of a cartridge picker.

Still another object is to provide an independently rotatable multi-carousel assembly which can be employed with two or more cartridge pickers for simultaneous operation between the cartridge pickers and respective multi-carousels, thereby significantly improving cartridge access time.

These and other objectives will be better understood from the following detailed description, taken together with the below described drawings.

DETAILED DESCRIPTION OF THE PREFERRED EMBODIMENTS

Figure 1:
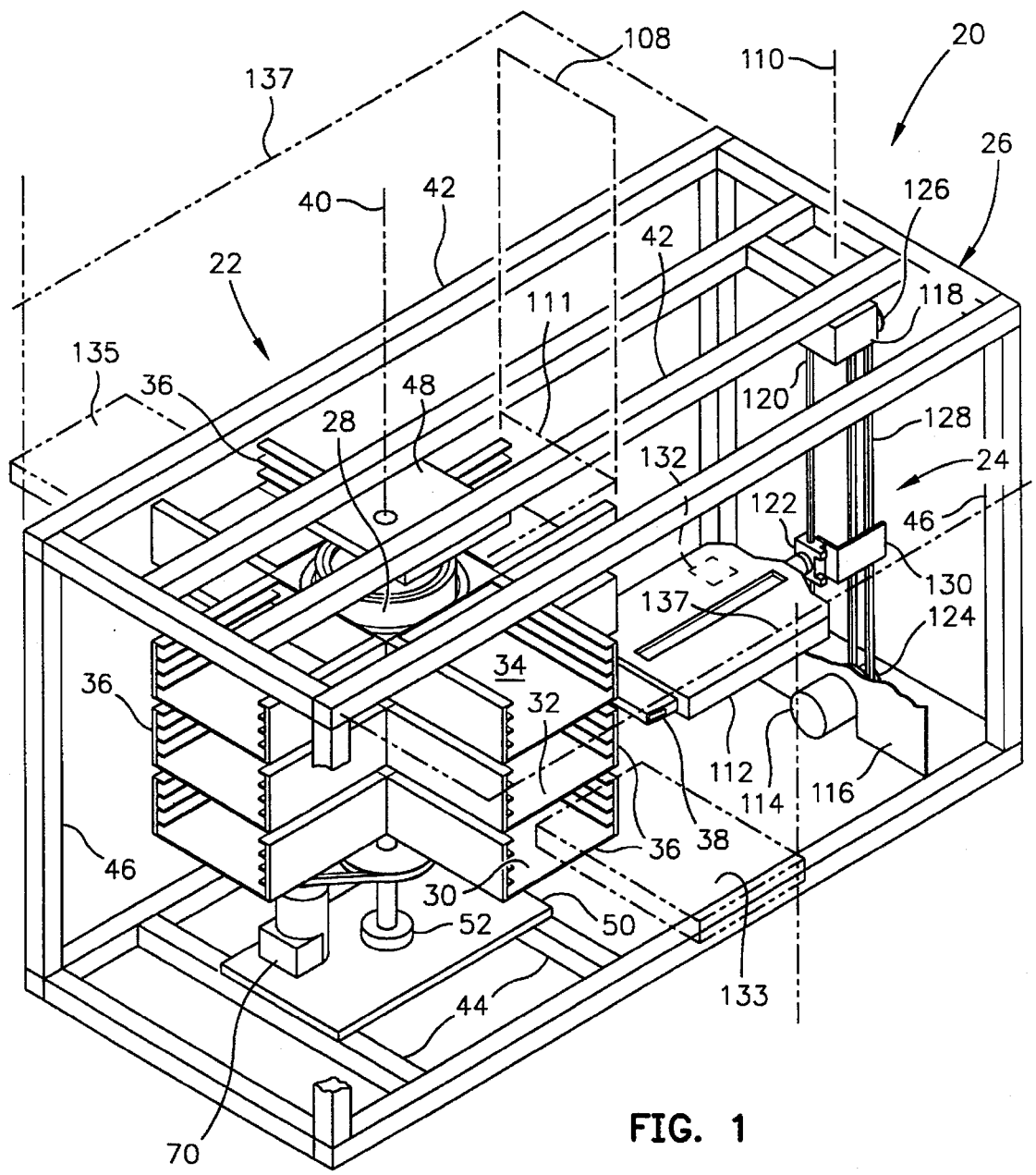
FIG. 1 is an isometric schematic illustration of the preferred embodiment of the present invention.

Referring now to the drawings wherein like reference numerals designate like or similar parts throughout the several views, there is illustrated in FIG. 1 a recordable media library 20 which may include a multi-carousel portion 22 and a cartridge picker portion 24, both of these portions being mounted on and interconnected by a support device, such a framework 26. It is to be understood that while the preferred embodiment is designated for recordable media, the invention could be used for any type of article which is to be moved by an appropriate article handling device.

Figure 2:
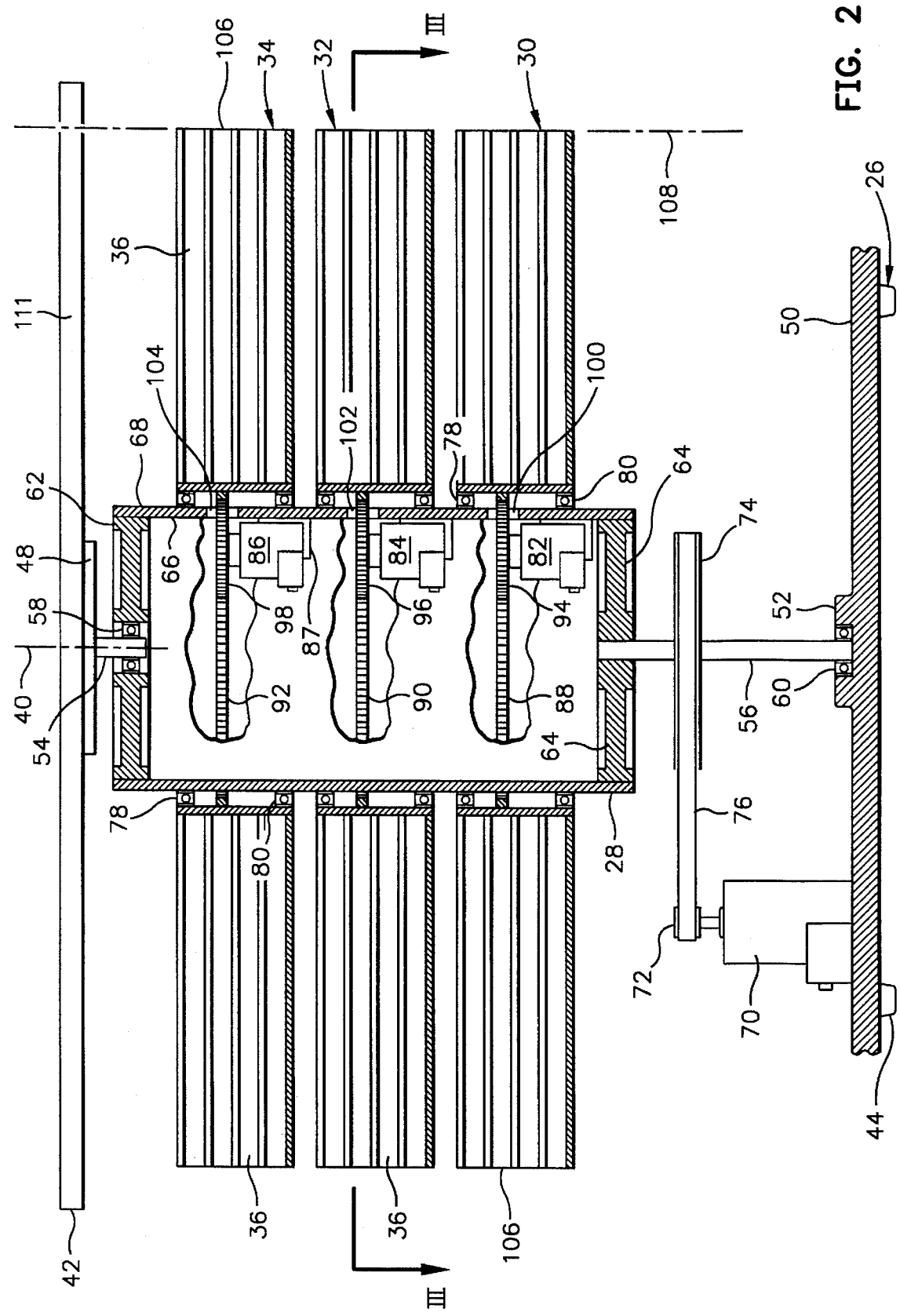
FIG. 2 is a vertical cross-sectional schematic illustration of a preferred embodiment of the invention.

As shown in FIGS. 1 and 2, the carousel portion of the recordable media library 20 includes a plurality of carousels. One of the carousels is a primary carousel 28 and the other carousels are sub-carousels 30, 32 and 34, the sub-carousels being preferably identical. Each sub-carousel is provided with a plurality of recordable media cartridge receptacles 36 which are stacked in respective columns, as illustrated in FIG. 1. Each sub-carousel may be provided with two pairs of cartridge receptacle columns, each pair being aligned along a respective lateral axis with the lateral axes of the pairs being substantially perpendicular with respect to one another. This arrangement, which is shown in FIG. 1, results in each sub-carousel having four columns of outwardly extending cartridge receptacles 36, each column being located in a respective quadrant about the carousel. The cartridge receptacles 36 in the sub-carousels can be utilized for optical disks, one of which is illustrated at 38 in FIG. 1, or for magnetic cartridges, such as tape cassettes or disks.

As shown in FIGS. 1 and 2, the primary carousel 28 is mounted on the framework 26 for rotation about a central axis 40. The framework 26 has top and bottom beams 42 and 44 which are supported by columns 46. Top and bottom plates 48 and 50 are fixed to the top and bottom beams 42 and 44, the bottom plate 50 having an upstanding hub 52. As shown in FIG. 2, the primary carousel 28 is rotatably mounted to the framework 26 by top and bottom shafts 54 and 56. The top shaft 54 is fixed to the plate 48 and rotatably mounted to the primary carousel 28 by roller bearing 58. The bottom shaft 56 is fixed to the primary carousel 28 and rotatably mounted in the hub 52 by a roller bearing 60. As shown in FIG. 2, the primary carousel 28 is a hollow drum with top and bottom ends 62 and 64 and inner and outer cylindrical surfaces 66 and 68. Power for the primary carousel 28 may be provided by a motor 70 which is mounted on the framework 26 via the plate 50, the motor having a pulley 72. The shaft 56 is provided with a pulley 74 so that a belt 76 can be employed between the pulleys 72 and 74 for driving the primary carousel 28.

Figure 3:
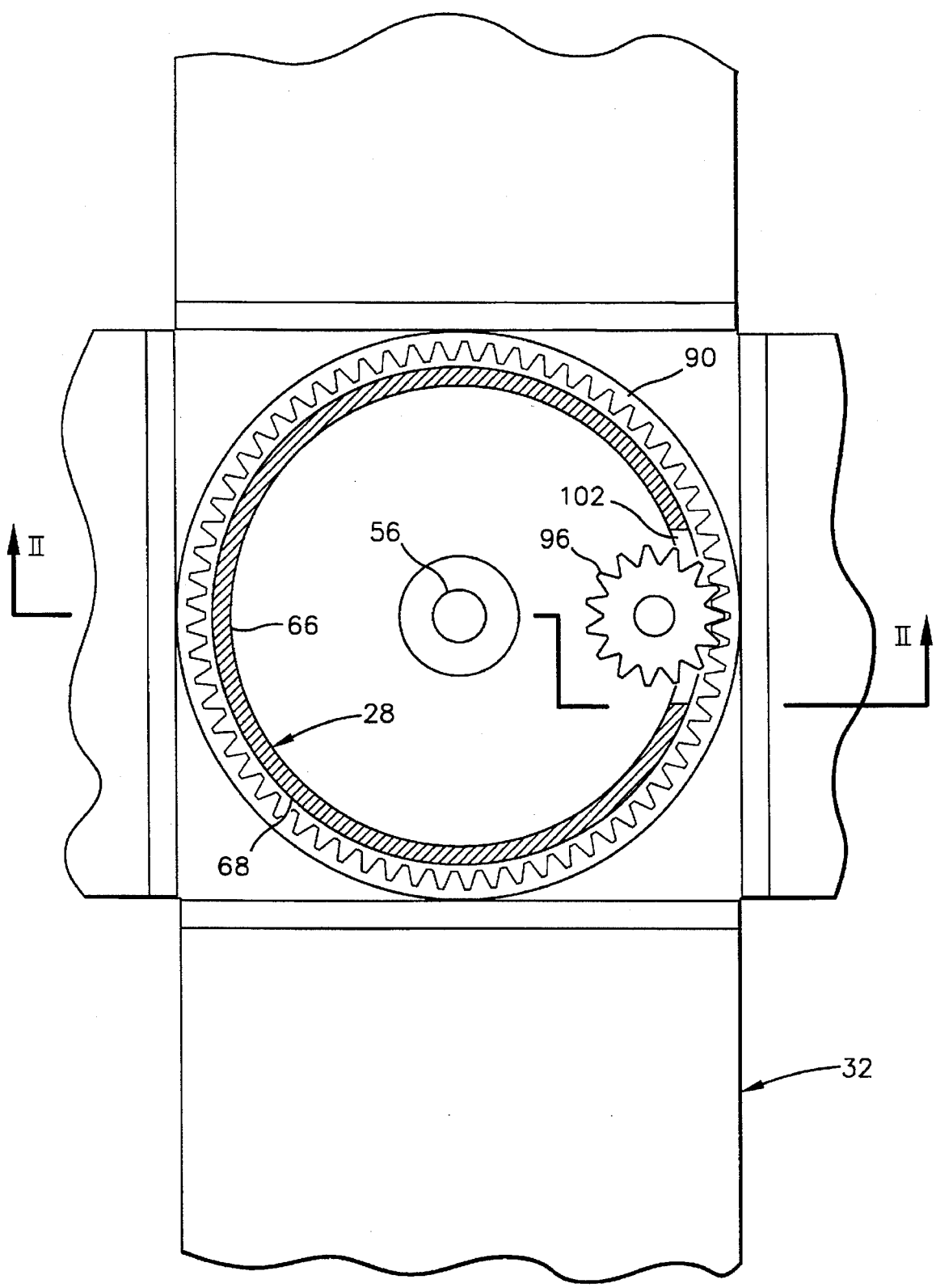
FIG. 3 is a view taken along plane III—III of FIG. 2.

The sub-carousels 30, 32 and 34 are rotatably mounted on the primary carousel 28. Each sub-carousel has an axis of rotation which is co-extensive with the central axis 40 of the primary carousel so that all carousels are rotatable about a common axis. Each of the sub-carousels is rotatably mounted on the outer cylindrical surface 68 of the primary carousel 28 by top and bottom large diameter roller bearings 78 and 80, the inner race of each bearing being fixed to the outer cylindrical surface 68 of the primary carousel 28 and the outer race of each bearing being connected to inner edges 66 of the cartridge receptacle columns, as best illustrated in FIG. 3. The pairs of roller bearings for each sub-carousel enable any one or a combination of the sub-carousels to rotate freely about the primary carousel 28 even though the primary carousel is kept stationary by the motor 70.

Power devices are interconnected between the sub-carousels 30, 32 and 34 and the primary carousel 28 for selectively rotating any one or a combination of the sub-carousels with respect to the primary carousel. This may be accomplished by motors 82, 84 and 86, each motor being mounted on the primary carousel 28 for operating a respective sub-carousel 30, 32 and 34. As shown in FIG. 2, each motor 82, 84 and 86 is mounted on the inner cylindrical surface 66 of the primary carousel by any suitable means, such as brackets 87, with the axes of rotation of the output shafts of the motors being parallel to the central axis 40. Each sub-carousel 30, 32 and 34 is provided with a respective internal ring gear 88, 90 and 92, each ring gear circumscribing the outside surface 68 of the drum-like primary carousel 28. As shown in FIG. 3, the ring gear 90 is fixed to the respective sub-carousel 32 at the inner ends of the columns of cartridge receptacles. The motors 82, 84 and 86 are provided with respective spur gears 94, 96 and 98 which extend through respective openings 100, 102 and 104 in the drum-like primary carousel 28 to engage and properly mesh with respective sub-carousel internal ring gears 88, 90 and 92. Each of the other sub-carousels, 30 and 34 is identical with the just described sub-carousel 32 along with its motor, ring gear and its mounting to the primary carousel 28.

Upon the rotation of the bottom sub-carousel 30, for instance, the two other sub-carousels 32 and 34 as well as the primary carousel 28 remain stationary because of the off condition of their respective motors. If desired, any other sub-carousel or a combination of carousels can be rotated by a respective motor or motors leaving the remainder of the sub-carousels and the primary carousel stationary. Operation of a single sub-carousel 30, 32 or 34 enables quick access time of the sub-carousel by the cartridge picker portion 24 and enables the use of smaller motors. Of primary importance, should any one of the sub-carousel motors 82, 84 or 86 fail, the motor 70 can be utilized to operate the primary carousel 28 to rotate all of the sub-carousels as a unit. Accordingly, the desired cartridge receptacle can still be made accessible for the cartridge picker portion 24. During operation of the primary carousel 28, by the motor 70, the still operational sub-carousel motors, should be rotated so that those sub-carousels rotate in an direction opposite to the direction in which the primary carousel 28 rotates. This will reduce load on the motor 70 and enable quicker access time.

As illustrated in FIGS. 1, 2 and 3, the cartridge receptacles 36 of each sub-carousel have outwardly located open-ends 106 with respect to the central axis 40. As shown in FIG. 2, the outer open ends 106 of the cartridge receptacles within any column of a sub-carousel are alignable in a common plane 108 which is in position to receive the cartridge 38, the common plane being parallel to the central axis 40. As shown in FIG. 1, this enables the cartridge picker portion 24 of the library to operate along a linear axis 110 for placing or removing cartridges with respect to the receptacles, the linear axis 110 being parallel to the common plane 108.

If desired, a cartridge drive could be employed with the recordable media library 20, such as that shown in phantom at 111 in FIGS. 1 and 2. The drive can be mounted to the framework 26 above the sub-carousels, as shown, or, if desired, below the sub-carousels. Also, a cartridge picker and drive assembly (not shown) could be mounted outside the framework 26 of the recordable media library 20 for operating through any one of the remaining three open ends of the framework 26. With either arrangement, cartridges can be transported back and forth between selected sub-carousel receptacle 36 and a cartridge picker driver.

The cartridge picker portion 24 includes a cartridge picker 112 which is moved vertically with respect to the cartridge receptacle columns along the linear axis 110, the linear axis 110 being parallel to the central axis of rotation 40 of the carousels. The vertical movement of the cartridge picker 112 is accomplished by a motor 114 which is fixed to a bottom of the framework 26 by a cross-member 116, the axis of rotation of the motor 114 being generally perpendicular to the common plane 108. A block 118 may be mounted to a top beam 42 of the framework. A guide rail, such as square rod 120, is affixed between the block 118 and the lateral support member 116 along a vertical axis which is substantially parallel to the carousel central axis 40. A carriage 122 connects the cartridge picker 112 to the rod 120, the carriage being slidably mounted on the shaft 120 so that the cartridge picker 112 can be moved up and down therealong. Pulleys 124 and 126 are connected to the motor 114 and the block 118 respectively, and a belt 128 extends therebetween for selectively moving the cartridge picker 112 via the carriage 122. The carriage 122 has a flange 130 which is connected to the belt 128 so that this desired movement takes place. The cartridge picker 112 has internal fingers or tongs (not shown) which selectively expand or contract in response to an internal solenoid shown schematically at 132. This kind of cartridge picker is well known in the prior art.

It should be understood that more than one cartridge picker could be employed with the carousel portion 22. Another cartridge picker is shown in phantom at 133 which is angularly displaced from the cartridge picker 112 by 90°. This cartridge picker 133 is identical to the cartridge picker portion 112. The advantage of having more than one cartridge picker is that the unique independent operation of the sub-carousels 30, 32 and 34 is then employed to significantly improve cartridge access time. While one sub-carousel is being rotated for access by one cartridge picker, another sub-carousel can be simultaneously rotated for access by the other cartridge picker. This same advantage can be obtained by locating the cartridge picker 133 180° from the cartridge picker 112 rather than 90°. An even further advantage is obtained by employing a third cartridge picker, such as that shown in phantom at 135 which is displaced 90° in the other direction from the cartridge picker 112. With three cartridge pickers full advantage is then taken of the three sub-carousels 30, 32 and 34. The framework 26 can easily be extended, such as that partially shown in phantom at 137, for accommodating the picker assemblies 133 and 135 in same manner that the framework supports picker assembly 112. If optimum access time is desired, four sub-carousels would be employed with a cartridge picker in each quadrant. This would enable four simultaneous operations between sub-carousels and respective cartridge pickers.

Figure 4:
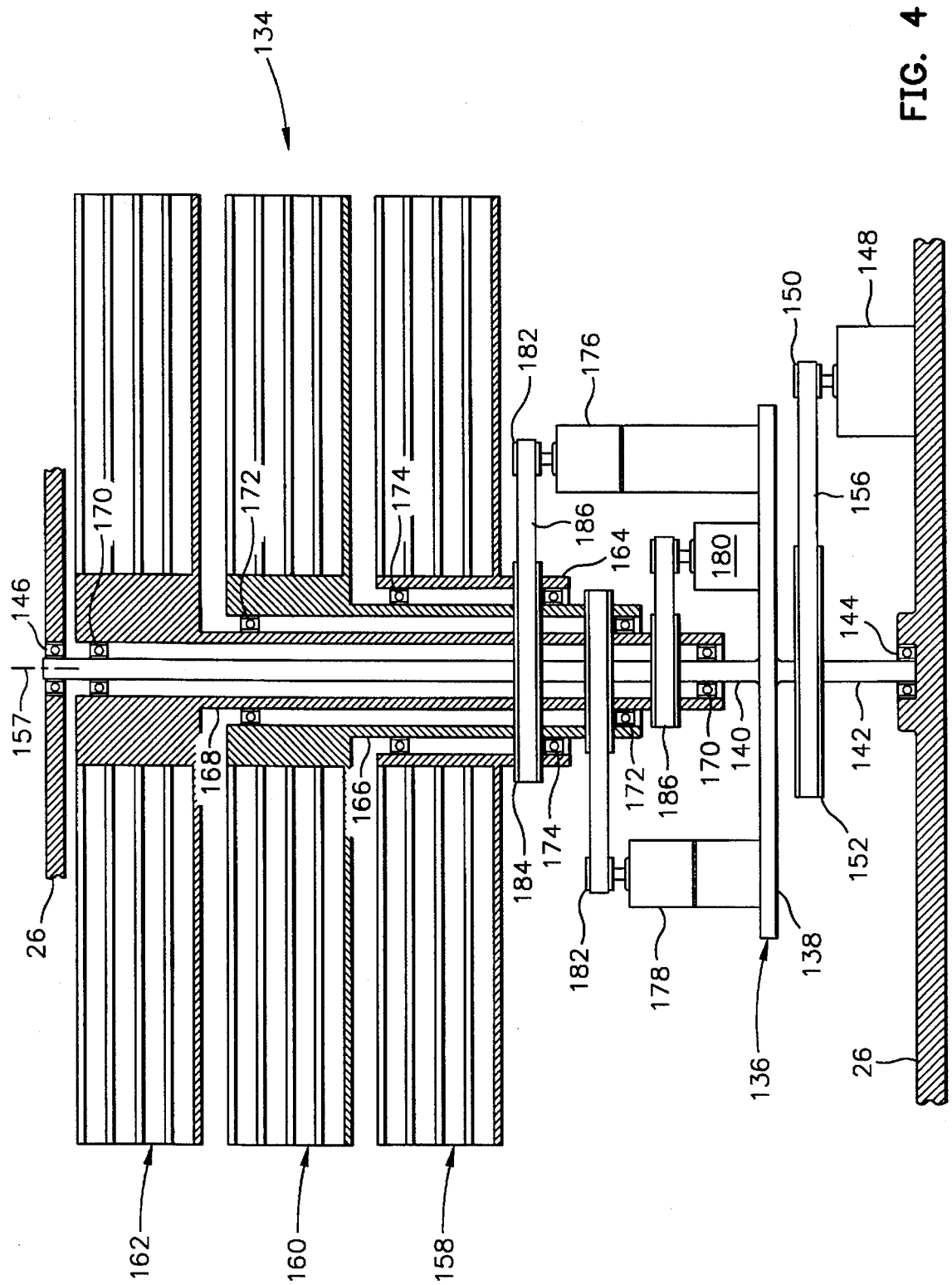
FIG. 4 is a generally vertical cross-sectional schematic illustration of another embodiment of the present invention.

Another embodiment of the carousel portion of the library is schematically illustrated at 134 in FIG. 4. In this embodiment, a primary carousel 136 includes a circular plate 138 upon which there is mounted an upwardly extending shaft 140. The primary carousel 136 may be rotatably mounted on the framework 26 by a downwardly extending shaft 142. The downwardly extending shaft 142 and the upwardly extending shaft 140 can be rotatably mounted to the framework 26 by bearings 144 and 146 respectively. A motor 148 is mounted to the framework 26 and has a pulley 150 which is operable on another pulley 152 on the bottom shaft 142 via a belt 156. Operation of the motor 148 will then rotate the primary carousel 136 about a central axis 157. Sub-carousels 158, 160 and 162 are rotatably mounted on the primary carousel 136 with their axes of rotation co-extensive with one another and with the central axis 157 of the primary carousel.

Each of the sub-carousels 158, 160 and 162 is provided with respective hollow cylindrical shafts 164, 166 and 168, the cylindrical shaft 168 of the sub-carousel 162 being rotatably mounted on the primary carousel shaft 140 by pairs of roller bearings 170, the cylindrical shaft 166 of the sub-carousel 160 being rotatably mounted on the cylindrical shaft 168 of the sub-carousel 162 by roller bearings 172 and the cylindrical shaft 164 of the sub-carousel 158 being rotatably mounted on the cylindrical shaft 166 of sub-carousel 160 by roller bearings 174. With this arrangement all of the sub-carousels are independently rotatable with respect to one another as well as with respect to the primary carousel 136. In order to accomplish this independent operation, motors 176, 178 and 180 are provided, the motor 176 rotating the sub-carousel 158, the motor 178 rotating the sub-carousel 160, and the motor 180 rotating the sub-carousel 162. The drive trains for the sub-carousels may be provided by motor pulleys 182, sub-carousel pulleys 184 and belts 186 extending respectively therebetween. Each of the sub-carousels 158, 160 and 162 may have two pairs of cartridge receptacle columns similarly to that as shown in FIG. 1. Cartridge receptacles in the sub-carousels of the embodiment 134 may be accessed by the cartridge picker means 24, illustrated in FIG. 1.

The method of the invention can be understood by reference to FIGS. 1 and 2. The method involves management of a recordable media library, such as that shown in 20, in FIG. 1, wherein the library includes a primary carousel 28 and a plurality of sub-carousels 30, 32 and 34. As shown in FIGS. 1 and 2, the sub-carousels have recordable media cartridge receptacles 36 which are accessible by the cartridge picker 112. The method includes selectively rotating any one and/or combination of sub-carousels 30, 32 and 34 and/or the primary carousel 28 about a common axis 40 until a sub-carousel is in a required position with respect to the cartridge picker 112. Then the cartridge picker 112 is moved along an axis 110 to remove or insert a cartridge 38 with respect to a sub-carousel cartridge receptacle 36.

Figure 5:
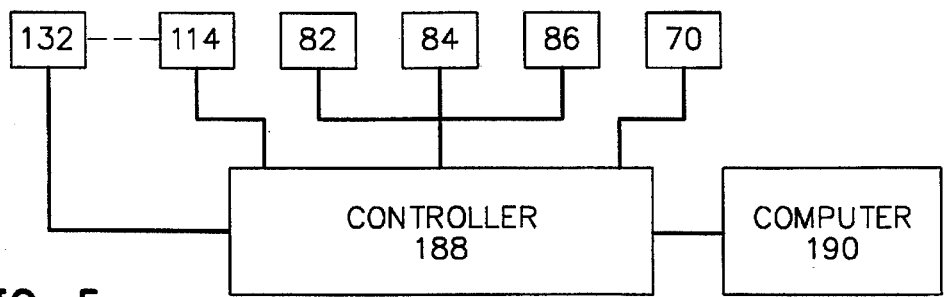
FIG. 5 is a block diagram illustrating an exemplary control system for the present invention.

The operation of the library 20 in FIG. 1 can be accomplished by selectively operating the various motors with on and off switches. It may be desirable, however, to automate this operation by an overall system which is illustrated in FIG. 5. The motor 70 should be capable of rotating the primary carousel 28 back and forth in a range of 360° about the central axis 40. Each of the sub-carousel motors 82, 84 and 86 should be capable of rotating the respective sub-carousel back and forth in a range of 360° about the central axis 40 while the primary carousel is kept stationary. The cartridge picker motor 114 is capable of raising and lowering the cartridge picker 112 within a limited vertical range for accessing the cartridge receptacles of the sub-carousels. The cartridge picker 112 is operated by a solenoid 132 which selectively causes fingers (not shown) within the cartridge picker to grab or release a respective cartridge 38. All of these motors are connected to a controller 188 which, in turn, is connected to a processor 190. The processor is provided with a processor-executed program which will enable the required functions of the library and the controller 188 provides the proper interface.

Figure 6:
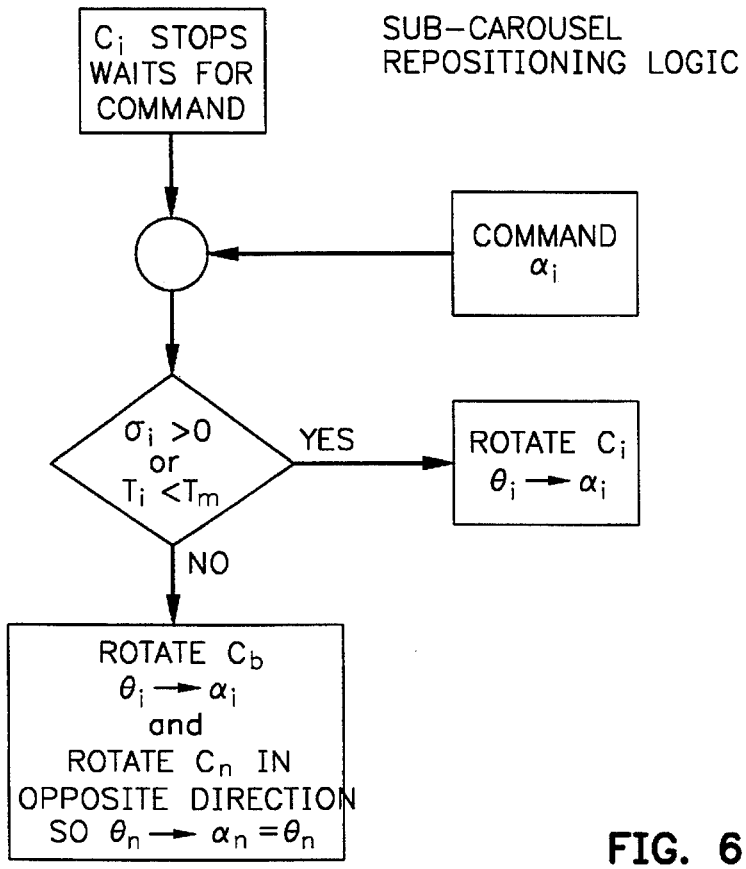
FIG. 6 is an exemplary program for the computer of FIG. 5 to implement a desired operation of the present invention.

An exemplary program which can be executed by the processor 190 to operate the sub-carousels 30, 32 and 34 or the primary carousel 28 is illustrated by the flow diagram in FIG. 6. Description of a program for the movement and operation of the cartridge picker 112 is omitted since this is well-known in the art. As shown in FIG. 6, all of the carousels are in a stop condition awaiting a command. A command $\alpha_i$ is initiated to tell a selected one of the sub-carousels to move to an angular position $\alpha_i$ from a stop zero position. When this command is made it is then determined whether the speed $\sigma_i$ of the sub-carousel $C_i$ is greater than zero or whether the torque $T_i$ to turn the sub-carousel $C_i$ less than the maximum allowable torque $T_m$ to turn the sub-carousel $C_i$. If the answer to both of these inquiries is yes, then the sub-carousel $C_i$ is rotated from its present location $\theta_i$ to the designated location $\alpha_i$. However, should the answer to either one of these inquiries be no, then the primary carousel $C_b$ is rotated from $\theta_i$ to $\alpha_i$, while all of the other carousels $C_n$, except the sub-carousel that is inoperative, are rotated in an opposite direction at the same angular rate as the primary carousel.

With the invention any one of the sub-carousels 30, 32 or 34 can be rotated independently to make a selected column of cartridge receptacles accessible to the cartridge picker 112. By rotating the sub-carousels independently, without rotation of the other sub-carousels or the primary carousel 28, the mass to be moved is minimized. This increases the speed of operation. Should the motor or power train of any sub-carousel fail, a back-up feature of the invention enables the library to continue its operation. This is accomplished by operating the motor 70 which will turn all of the sub-carousels as a unit to make the required cartridge receptacle accessible to the cartridge picker 112. If desired, the sub-carousels that are still operational may be turned in a direction opposite to the primary carousel 28 to minimize the power requirements of the primary carousel motor 70 and render quicker accessibility.

Although the invention has been described in terms of the specific embodiments, the inventor contemplates modifications and substitutions to various components of the invention would occur to the person of ordinary skill in the art and therefor, would be in the scope of the invention, which to be limited only by the claims which follows.

I claim:

1. In a recordable media library, a combination comprising: a plurality of carousels, one of the carousels being a primary carousel and the other carousels being sub-carousels, each sub-carousel having a plurality of recordable media cartridge receptacles which are arranged in a respective circle about a respective sub-carousel axis;

a base;

the primary carousel being rotatably mounted on the base for rotation about a primary axis;

the primary carousel including an elongated support which has an outer surface the longitudinal axis of the elongated support and the primary axis being co-axial along a common axis;

each sub-carousel being rotatably mounted on the outer surface of the elongated support for rotation about its respective sub-carousel axis with its respective sub-carousel axis being co-axial with said common axis and with its respective recordable media cartridge receptacles arranged in said respective circle about said common axis; and the recordable media cartridge receptacles of each sub-carousel being arranged so that they are moved in a respective common circle about the common axis when either the sub-carousel or the primary carousel is rotated about said common axis.

2. The combination as claimed in claim 1, including:

the receptacles of each sub-carousel having outwardly located open ends with respect to the common axis; and the outward open ends of the receptacles of the sub-carousels being alignable for access in a plurality of access planes which are parallel to and located in circles having equal radii with respect to said common axis.

3. The combination as claimed in claim 2, including:

at least one cartridge picker mounted on the base for selectively removing and replacing cartridges with respect to any receptacle having an open end aligned in one of the access planes; and power means connecting the cartridge picker to the base for aligning the cartridge picker with selected cartridge receptacles within the access plane.

4. The combination as claimed in claim 3, including:

a plurality of cartridge pickers for selectively removing and replacing cartridges with respect to any receptacle having one of said ends alignable in said plurality of access planes, the cartridge pickers being positioned in different access planes for simultaneous operation with respect to the receptacles in respective sub-carousels.

5. The combination as claimed in claim 4, including:

the number of sub-carousels and cartridge pickers being equal.

6. The combination as claimed in claim 1, including:

power means interconnecting the sub-carousels and the primary carousel for selectively rotating any one of the sub-carousels with respect to the primary carousel.

7. The combination as claimed in claim 6, including:

second power means interconnecting the support means and the primary carousel for selectively rotating the primary carousel.

8. The combination as claimed in claim 6, wherein the power means for the sub-carousels includes:

a plurality of sub-carousel motors, each sub-carousel motor being connected to a respective sub-carousel; and each sub-carousel motor being mounted to the primary carousel.

9. A recordable media cartridge library comprising:

a plurality of carousels, one of the carousels being a primary carousel and the other carousels being sub-carousels, each sub-carousel having recordable media cartridge receptacles which are arranged about a respective sub-carousel axis;

a base;

the primary carousel being rotatably mounted to the base;

first power means connected to the base for selectively rotating the primary carousel about a central axis;

the primary carousel including an elongated support which has an outer surface, the longitudinal axis of the elongated support and the primary axis being co-axial along a common axis;

each sub-carousel being rotatably mounted on the outer surface of the elongated support with its respective sub-carousel axis co-axial with the central axis and with its respective recordable media cartridge receptacles arranged in a respective circle about said central axis;

second power means connected to the primary carousel for selectively rotating each of the sub-carousels about its respective sub-carousel axis;

the cartridge receptacles of each sub-carousel having outwardly located open ends with respect to the central axis;

the sub-carousels outward open ends being alignable in a common plane which is parallel to said central axis;

a cartridge picker for selectively removing and replacing cartridges with respect to any receptacle having an open end aligned in said common plane; and third power means connecting the picker to the base for aligning the cartridge picker with selected cartridge receptacles.

10. A combination including the cartridge library of claim 9, the combination comprising:
at least one cartridge drive associated with the cartridge library;
transport means associated with the cartridge library and the cartridge drive for transporting selected cartridges between the sub-carousel receptacles and the cartridge drive.

11. A combination as claimed in claim 10, including:
the cartridge drive being mounted to the support with an open end aligned in said common plane; and
the transport means including said cartridge picker.

12. A recordable media cartridge library, as claimed in claim 10, including:
a controller connected to the cartridge picker, the first power means, the second power means, and the third power means; and
a computer containing instructions for operating the library, the computer being connected to the controller.

13. In a recordable media library, a combination comprising:
a plurality of carousels, one of the carousels being a primary carousel and the other carousels being sub-carousels, the sub-carousels having recordable media cartridge receptacles; and
a base;
the primary carousel being rotatably mounted on the base for rotation about a central axis;
the sub-carousels being rotatably mounted on the primary carousel, such that:
each sub-carousel is rotatable about an axis of rotation that is co-linear with the central axis;
each sub-carousel is rotatable independently of any other sub-carousel in response to the primary carousel being stationary; and
all sub-carousels are rotatable with the primary carousel;
the primary carousel including an elongated cylinder which has an outer generally cylindrical surface, the longitudinal axis of the elongated cylinder being co-extensive with said central axis; and
the sub-carousels being rotatably mounted on the outer cylindrical surface of the elongated cylinder;
power means interconnecting the sub-carousels and the primary carousel for selectively rotating any one of the sub-carousels with respect to the primary carousel; and
the power means for the sub-carousels including:
a plurality of sub-carousel motors, each sub-carousel motor being connected to a respective sub-carousel; and
each sub-carousel motor being mounted to the primary carousel.

14. The combination as claimed in claim 13, including:
the receptacles of each sub-carousel having outwardly located open ends with respect to the central axis; and
the outward open ends of the receptacles of the sub-carousels being alignable for access in a plurality of access planes which are parallel to said central axis.

15. The combination as claimed in claim 13, including:
the elongated cylinder being a hollow drum which has an inner surface;
each sub-carousel motor being mounted to the inside surface of the hollow drum;
a ring gear mounted on each sub-carousel, each ring gear circumscribing the outside surface of the hollow drum;
the hollow drum having an opening opposite each respective ring gear; and
a spur gear connected to each respective sub-carousel motor and extending through a respective drum opening to engage a respective ring gear.

16. The combination as claimed in claim 15, including:
the receptacles of each sub-carousel having outwardly located open ends with respect to the central axis; and
the outward open ends of the receptacles of the sub-carousels being alignable for access in a plurality of access planes which are parallel to said central axis.

17. The combination as claimed in claim 16, including:
power means interconnecting the support and the primary carousel for selectively rotating the primary carousel about the central axis.

18. The combination as claimed in claim 17, including:
a cartridge picker for selectively are moving and replacing cartridges with respect to any receptacle when the receptacle is aligned in said common plane; and
second power means connecting the cartridge picker to the support for aligning the cartridge picker with selected cartridge receptacles.

19. The combination as claimed in claim 18, including:
each sub-carousel having two pairs of columns of cartridge receptacles; and
each pair or columns being aligned along a respective lateral axis, the lateral axes of the pairs of columns being substantially perpendicular with respect to one another and perpendicular to said central axis.

20. The combination as claimed in claim 19, including:
a plurality of said cartridge pickers for selectively removing and replacing the cartridges with respect to any receptacle having an open end alignable in said plurality of access planes, the cartridge pickers being positioned in access planes which are angularly spaced from one another in 90° multiples for simultaneous operation with respect to the receptacles in respective sub-carousels.

21. The combination as claimed in claim 20, including:
the number of sub-carousels and cartridge pickers being equal.

22. A recordable media cartridge library comprising:
a plurality of carousels, one of the carousels being a primary carousel and the other carousels being sub-carousels, the sub-carousels having recordable media cartridge receptacles;
the primary carousel including an elongated cylinder which has an outer generally cylindrical surface, the longitudinal axis of the elongated cylinder being co-extensive with said central axis;
each of the sub-carousels being rotatably mounted on the outer surface of said elongated cylinder;
a base;
first power means connected to the base for selectively rotating the primary carousel about a central axis;
second power means connected to the primary carousel for selectively rotating each of the sub-carousels about an axis which is co-linear with said central axis;
the cartridge receptacles of each sub-carousel having outwardly located open ends with respect to the central axis;
the sub-carousels outward open ends being alignable in a common plane which is parallel to said central axis;
a cartridge picker for selectively removing and replacing cartridges with respect to any receptacle having an open end aligned in said common plane; and third power means connecting the picker to the support means for aligning the cartridge picker with selected cartridge receptacles;

at least one cartridge drive associated with the cartridge library;

transport means associated with the cartridge library and the cartridge drive for transporting selected cartridges between the sub-carousel receptacles and the cartridge drive;

a controller connected to the cartridge picker, the first power means, the second power means, and the third power means; and a computer containing instructions for operating the library, the computer being connected to the controller.

23. A recordable media cartridge library as claimed in claim 22, including:

the elongated cylinder being a hollow drum with an inner surface;

the second power means including a plurality of motors, each motor being mounted to the inside surface of the hollow drum and connected to a respective sub-carousel;

a ring gear mounted to each sub-carousel and circumscribing the outside surface of the hollow drum;

the hollow drum having an opening opposite each respective ring gear; and a spur gear connected to each sub-carousel motor and extending through a respective drum opening to engage a respective ring gear.

24. In a recordable media library, a combination comprising:

a plurality of carousels, one of the carousels being a primary carousel and the other carousels being sub-carousels, each sub-carousel having recordable media cartridge receptacles which are arranged about a respective sub-carousel axis;

a support;

the primary carousel being rotatably mounted on the support for rotation about a central axis;

each sub-carousel being rotatably mounted on the primary carousel, about its respective sub-carousel axis;

each sub-carousel axis being co-linear with the central axis;

each sub-carousel being rotatable independently of any other sub-carousel in response to the primary carousel being stationary;

each sub-carousel being rotated about its respective sub-carousel axis in response to the primary carousel being rotated about its central axis;

power means interconnecting the sub-carousels and the primary carousel for selectively rotating any one of the sub-carousels with respect to the primary carousel, the power means for the sub-carousels including a plurality of sub-carousel motors, each sub-carousel motor being connected to a respective sub-carousel and each sub-carousel motor being mounted to the primary carousel;

the primary carousel including an elongated support which has an outer surface, the longitudinal axis of the elongated support being co-extensive with said central axis; and the sub-carousels being rotatably mounted on the outer surface of the elongated support.

25. The combination as claimed in claim 24, including:

the receptacles of each sub-carousel having outwardly located open ends with respect to the central axis; and the outward open ends of the receptacles of the sub-carousels being alignable for access in a plurality of access planes which are parallel to said central axis.

26. The combination as claimed in claim 24, including:

the elongated support being hollow with an inner surface;

each sub-carousel motor being mounted to the inner surface of the elongated support;

a ring gear mounted on each sub-carousel, each ring gear circumscribing the outside surface of the elongated support;

the elongated support having an opening opposite each respective ring gear; and a spur gear connected to each respective sub-carousel motor and extending through a respective opening in the elongated support to engage a respective ring gear.

27. The combination as claimed in claim 26, including:

the receptacles of each sub-carousel having outwardly located open ends with respect to the central axis; and the outward open ends of the receptacles of the sub-carousels being alignable for access in a plurality of access planes which are parallel to said central axis.

28. The combination as claimed in claim 27, including:

power means interconnecting the support and the primary carousel for selectively rotating the primary carousel about the central axis.

29. The combination as claimed in claim 28, including:

a cartridge picker for selectively removing and replacing cartridges with respect to any receptacle when the receptacle is aligned in said common plane; and second power means connecting the cartridge picker to the support for aligning the cartridge picker with selected cartridge receptacles.

30. The combination as claimed in claim 29, including:

each sub-carousel having two pairs of columns of cartridge receptacles; and each pair or columns being aligned along a respective lateral axis, the lateral axes of the pairs of columns being substantially perpendicular with respect to one another and perpendicular to said central axis.

31. The combination as claimed in claim 30, including:

a plurality of said cartridge pickers for selectively removing and replacing the cartridges with respect to any receptacle having an open end alignable in said plurality of access planes, the cartridge pickers being positioned in access planes which are angularly spaced from one another in 90° multiples for simultaneous operation with respect to the receptacles in respective sub-carousels.

32. The combination as claimed in claim 31, including:

the number of sub-carousels and cartridge pickers being equal.

33. A recordable media cartridge library comprising:

a plurality of carousels, one of the carousels being a primary carousel and the other carousels being sub-carousels, each sub-carousel having recordable media cartridge receptacles which are arranged about a respective sub-carousel axis;

a support;

first power means connected to the support for selectively rotating the primary carousel about a central axis;

second power means connected to the primary carousel for selectively rotating each of the sub-carousels about its respective sub-carousel axis;

each sub-carousel axis being co-linear with said central axis;

the cartridge receptacles of each sub-carousel having outwardly located open ends with respect to the central axis;

the sub-carousels outward open ends being alignable in a common plane which is parallel to said central axis;

a cartridge picker for selectively removing and replacing cartridges with respect to any receptacle having an open end aligned in said common plane;

third power means connecting the picker to the support means for aligning the cartridge picker with selected cartridge receptacles;

at least one cartridge drive associated with the cartridge library;

transport means associated with the cartridge library and the cartridge drive for transporting selected cartridges between the sub-carousel receptacles and the cartridge drive;

a controller connected to the cartridge picker, the first power means, the second power means, and the third power means;

a computer containing instructions for operating the library, the computer being connected to the controller;

the primary carousel including an elongated support which has an outer surface, the longitudinal axis of the elongated support being co-extensive with said central axis; and each of the sub-carousels being rotatably mounted on the outer surface of said elongated support.

34. A recordable media cartridge library as claimed in claim 33, including:

the elongated support being hollow with an inner surface;

the second power means including a plurality of motors, each motor being mounted to the inside surface of the elongated support and connected to a respective sub-carousel;

a ring gear mounted to each sub-carousel and circumscribing the outside surface of the elongated support;

the elongated support having an opening opposite each respective ring gear; and a spur gear connected to each sub-carousel motor and extending through a respective opening in the elongated support to engage a respective ring gear.

35. A combination comprising:

a base;

a primary carousel rotatably mounted on the base for rotation about a primary carousel axis;

a plurality of sub-carousels, each sub-carousel having a sub-carousel axis about which the sub-carousel can rotate;

each sub-carousel having a plurality of recordable media receptacles arranged in a circle about a respective sub-carousel axis so that when the sub-carousel is rotated about its respective sub-carousel axis its recordable media cartridges correspondingly rotate in a circle about its respective sub-carousel axis;

the primary carousel including an elongated support which has an outer surface, the longitudinal axis of the elongated support being co-axial with said primary carousel axis; and each of the plurality of sub-carousels being rotatably mounted on the outer surface of the elongated support with all of the sub-carousel axes and said primary axis being co-axial with respect to one another along a common axis and with all of the recordable media receptacles being located equidistant from said common axis so that recordable media cartridge receptacles of any one of the sub-carousel rotates in said circle about said common axis when either said any one of the sub-carousels is rotated or said primary carousel is rotated about the common axis.

36. The combination as claimed in claim 35, including:

the receptacles of each sub-carousel having outwardly located open ends with respect to the common axis; and the outward open ends of the receptacles of the sub-carousels being alignable for access in a plurality of access planes which are parallel to and located in circles having equal radii with respect to said common axis.

37. The combination as claimed in claim 36, including:

at least one cartridge picker mounted on the support for selectively removing and replacing cartridges with respect to any receptacle having an open end aligned in one of the access planes; and power means connecting the cartridge picker to the support for aligning the cartridge picker with selected cartridge receptacles within the access plane.

38. The combination as claimed in claim 37, including:

a plurality of said cartridge pickers for selectively removing and replacing cartridges with respect to any receptacle having an open end alignable in said plurality of access planes, the cartridge pickers being positioned in different access planes for simultaneous operation with respect to the receptacles in respective sub-carousels.

39. The combination as claimed in claim 38, including:

the number of sub-carousels and cartridge pickers being equal.

40. The combination as claimed in claim 35, including:

power means interconnecting the sub-carousels and the primary carousel for selectively rotating any one of the sub-carousels with respect to the primary carousel.

41. The combination as claimed in claim 40, including:

second power means interconnecting the support means and the primary carousel for selectively rotating the primary carousel.

42. The combination as claimed in claim 40, wherein the power means for the sub-carousels includes:

a plurality of sub-carousel motors, each sub-carousel motor being connected to a respective sub-carousel; and each sub-carousel motor being mounted to the primary carousel.

43. A library as claimed in claim 24 including:

the sub-carousel comprising first and second sub-carousels;

the first sub-carousel comprising a first cylinder which is rotatably mounted on said elongated support; and the second sub-carousel comprising a second cylinder which is rotatably mounted on said first cylinder.

44. A library as claimed in claim 43 including:

the first cylinder having a drive portion which extends beyond said second cylinder;

the power means including a first motor interconnecting said drive portion to said primary carousel for rotating the first sub-carousel relative to the primary carousel; and the power means including a second motor interconnecting the second cylinder to said primary carousel for rotating the second sub-carousel relative to the primary carousel.

* * * * *

UNITED STATES PATENT AND TRADEMARK OFFICE
CERTIFICATE OF CORRECTION

PATENT NO. : 5,642,339
DATED : June 24, 1997
INVENTOR(S) : Dang

It is certified that error appears in the above-indentified patent and that said Letters Patent is hereby corrected as shown below:

Column 7, line 41, insert a "comma" between "surface" and "the".

Column 10, line 17, change "are moving" to --removing--.

Signed and Sealed this

Twenty-fourth Day of February, 1998

Attest:

BRUCE LEHMAN

*Attesting Officer*     *Commissioner of Patents and Trademarks*